United States Patent
Horvatich et al.

(10) Patent No.: US 12,281,881 B1
(45) Date of Patent: *Apr. 22, 2025

(54) DIGITAL TRANSPARENT ARMOR SYSTEM

(71) Applicant: Armorworks Holdings, Inc., Chandler, AZ (US)

(72) Inventors: Valent Horvatich, Scottsdale, AZ (US); Devin Roden, Chandler, AZ (US); Brad Belcher, Chandler, AZ (US); Louis Jack Musetti, Laguna Beach, CA (US)

(73) Assignee: Armorworks Holdings, Inc., Chandler, AZ (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/197,954

(22) Filed: May 16, 2023

Related U.S. Application Data

(63) Continuation of application No. 17/065,470, filed on Oct. 7, 2020, now Pat. No. 11,650,029.

(60) Provisional application No. 62/913,162, filed on Oct. 9, 2019.

(51) Int. Cl.
| | |
|---|---|
| *F41H 5/22* | (2006.01) |
| *H04N 7/18* | (2006.01) |
| *H04N 23/54* | (2023.01) |
| *H04N 23/69* | (2023.01) |
| *H04N 23/695* | (2023.01) |

(52) U.S. Cl.
CPC ............ *F41H 5/226* (2013.01); *H04N 7/18* (2013.01); *H04N 23/54* (2023.01); *H04N 23/69* (2023.01); *H04N 23/695* (2023.01)

(58) Field of Classification Search
None
See application file for complete search history.

(56) References Cited

U.S. PATENT DOCUMENTS

| | | | |
|---|---|---|---|
| 2,861,021 | A | 11/1958 | Dietz et al. |
| 3,658,636 | A | 4/1972 | Beckmann et al. |
| 5,506,051 | A | 4/1996 | Levy-Borochov et al. |
| 5,670,935 | A | 9/1997 | Schofield et al. |
| 8,161,862 | B1 | 4/2012 | Pinckney et al. |
| 9,296,339 | B2 | 4/2016 | Bingle et al. |
| 2012/0212613 | A1 | 8/2012 | Yamaguchi |
| 2017/0334366 | A1 | 11/2017 | Sliwa |
| 2018/0082140 | A1 | 3/2018 | Ida |
| 2019/0128641 | A1* | 5/2019 | Campbell ............... F41G 1/30 |
| 2019/0268550 | A1* | 8/2019 | Arnold ................ A42B 3/042 |
| 2020/0001787 | A1* | 1/2020 | Lu ....................... B60Q 9/008 |

(Continued)

*Primary Examiner* — Stefan Gadomski
(74) *Attorney, Agent, or Firm* — Schwartz Law Firm, P.C.; Jeffrey J. Schwartz

(57) ABSTRACT

Apparatus and methods are provided for a video enabled armor system for use in an armored surface of a vehicle. In one embodiment the system has an exterior facing ballistic resistant armor panel mounted over an opening in the armored surface of the vehicle, with the armor panel overlaying the armored surface around a perimeter of the opening. The armor panel has a first aperture in a portion of the panel adjacent the opening, and a first video camera disposed in the first aperture aimed outward through the first aperture. The system may further include a video display operatively connected to the first video camera and mounted over the opening on an interior side of the armored surface.

12 Claims, 8 Drawing Sheets

(56) References Cited

U.S. PATENT DOCUMENTS

2020/0304759 A1    9/2020  Berkeley
2021/0246643 A1*   8/2021  Sonovani .................. A61L 2/24

* cited by examiner

DIGITAL TRANSPARENT ARMOR SYSTEM

TECHNICAL FIELD

This application claims priority to Provisional patent application No. 62/913,162, the entire contents of which are hereby incorporated by reference. The technical field of the present invention relates to armor panels, and may further relate to transparent armor used in vehicles and other applications.

BRIEF DESCRIPTION OF THE DRAWINGS

In the accompanying drawings:

FIG. 4 is another interior perspective view of the vehicle door and digital transparent armor system of FIG. 3 with the digital display turned on;

DESCRIPTION OF THE EMBODIMENTS

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
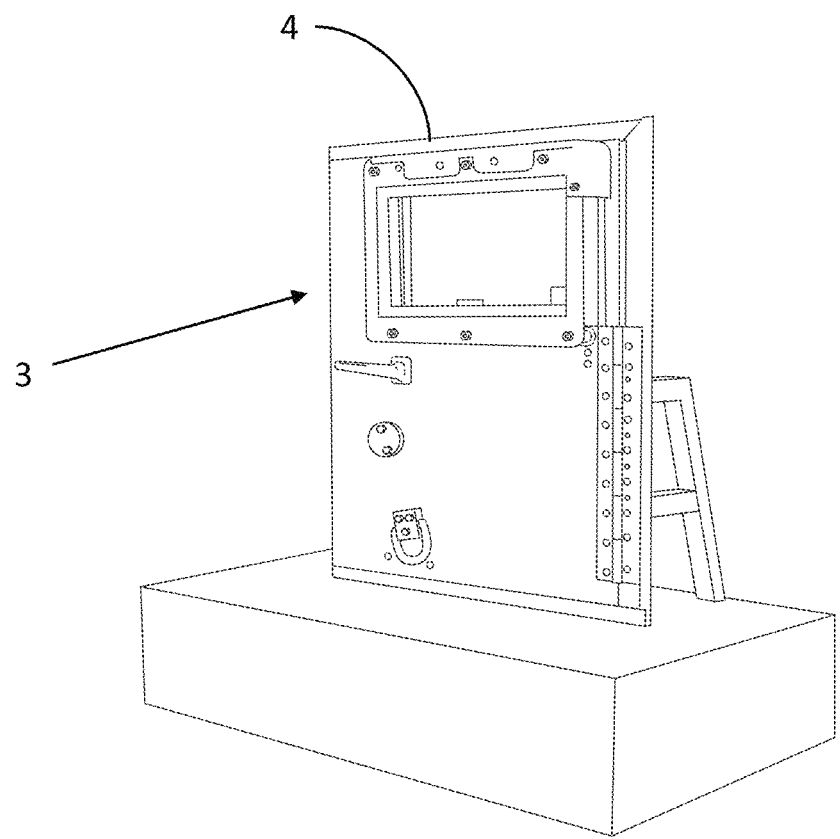
FIG. 1 is a depiction of a prior art transparent armor panel mounted in a vehicle door.

Referring now to the drawing figures, exemplary embodiments of a digital transparent armor system in accordance with the present disclosure are illustrated, and indicated generally at reference numeral 1. FIG. 1 illustrates an exemplary prior art transparent armor system 3 installed in an armored vehicle door 4. Conventional transparent armor is made of multiple laminations of thick glass, and commonly utilized as a ballistic resistant replacement for vehicle manufacturer windows and windshields. The present inventors have recognized several shortcomings to such armor, including notably excessive weight, and substantial or total loss of transparency from even a single projectile strike. The digital transparent armor system disclosed here addresses these and other issues associated with conventional transparent armor systems.

Figure 2:
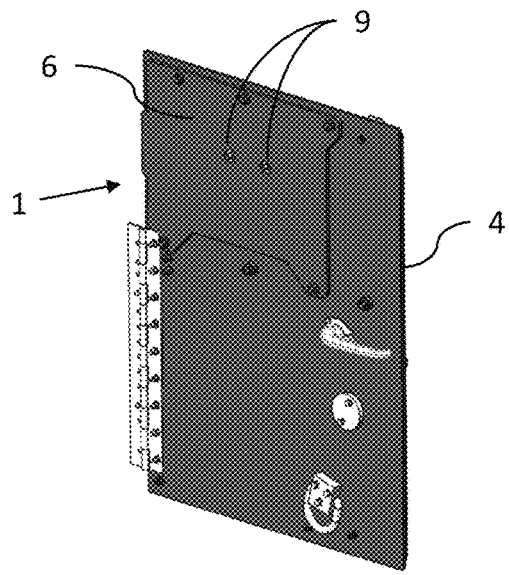
FIGS. 2 and 3 are exterior and interior perspective views of a vehicle door fitted with the digital transparent armor system of the present disclosure.
Figure 3:
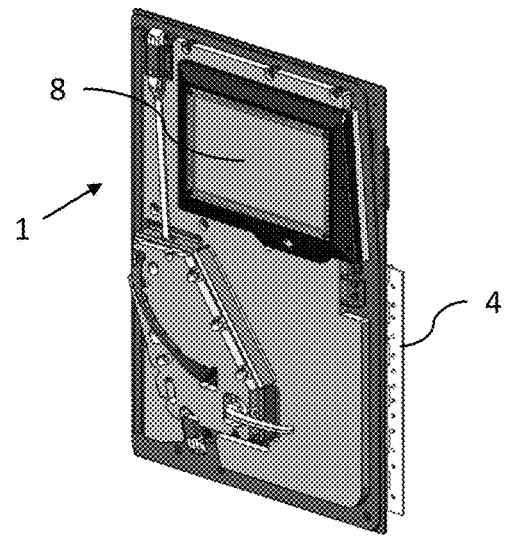
Figure 4:
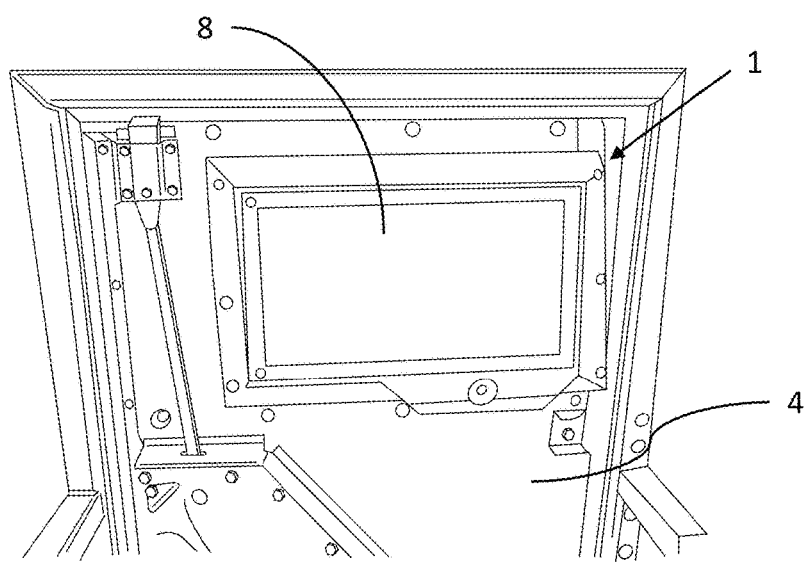

FIGS. 2 through 4 illustrate an armored vehicle door 4 incorporating a digital transparent armor system 1 in accordance with the present disclosure. The digital transparent armor system may be configured as a drop-in replacement for conventional transparent armor such as that shown in FIG. 1. Although in the depicted embodiment the armor system 1 is installed a door, the system may replace any vehicle window, windshield, or other transparent panel. In addition, the digital transparent armor system may be used on portions of a vehicle or structure normally without a window to provide a digitally created window view to the outside through an otherwise opaque surface.

Figure 5:
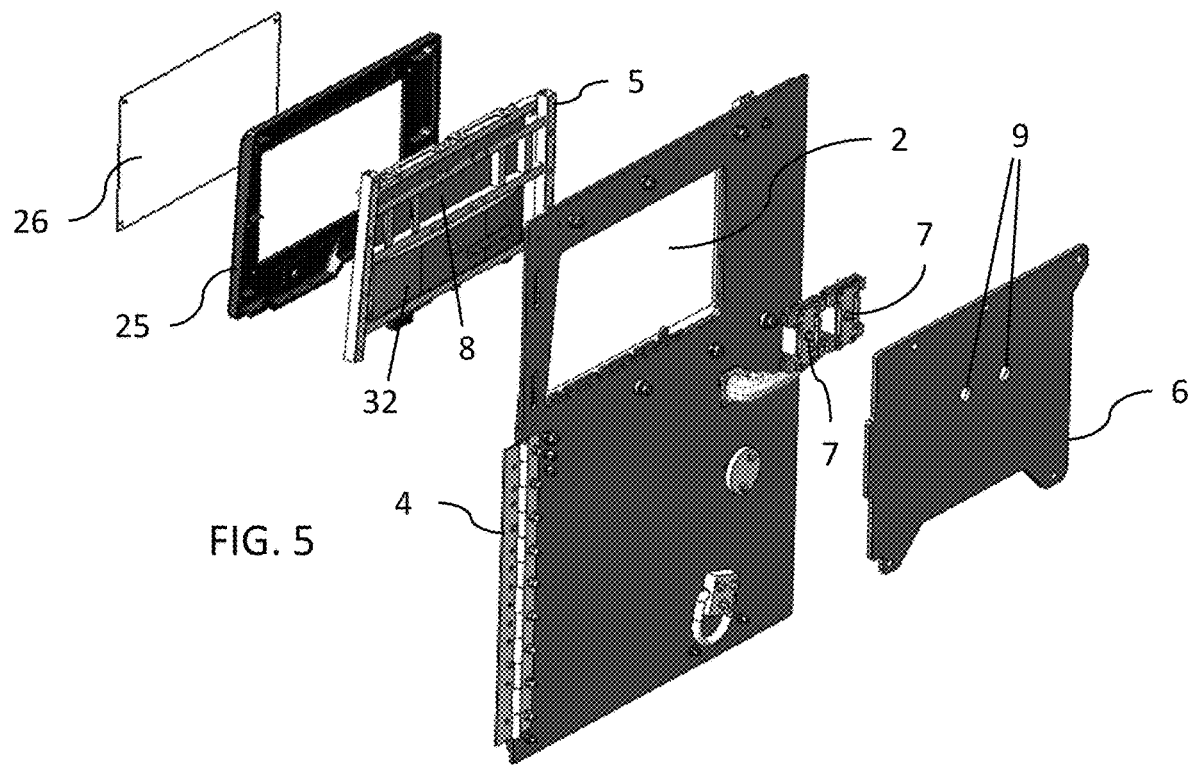
FIGS. 5 and 6 are outside and inside perspective exploded views of the vehicle door mounted digital transparent armor system.
Figure 6:
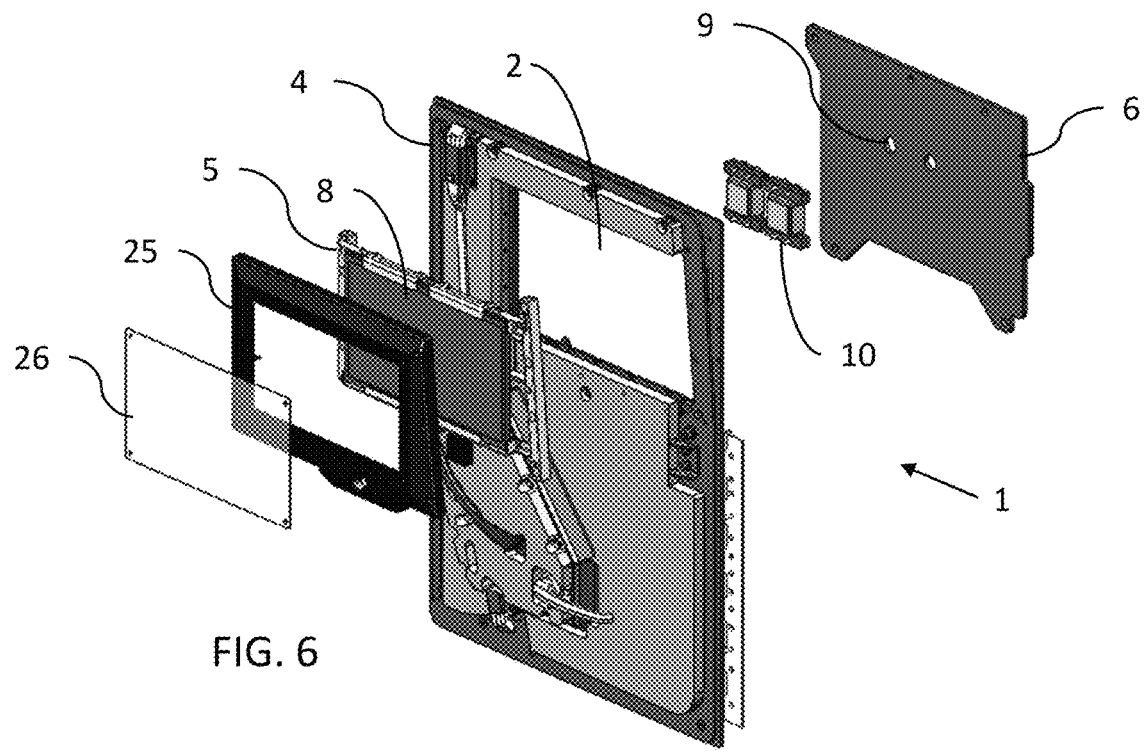
Figure 8:
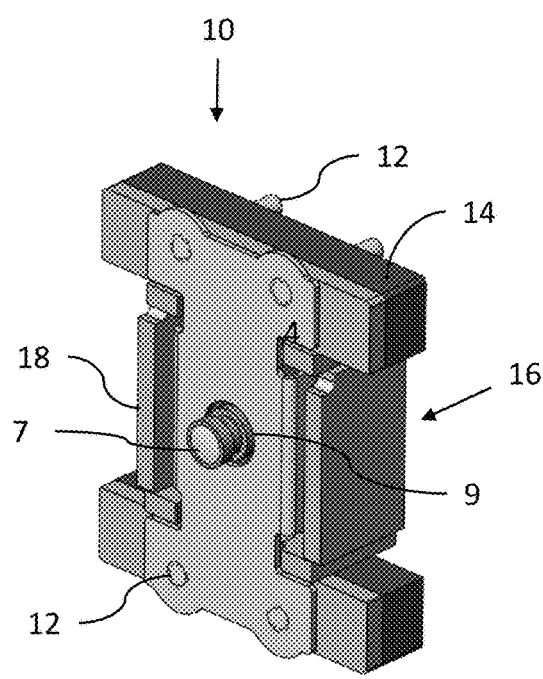
FIGS. 8 and 9 are outside and inside perspective views of the digital video camera and armored camera mounting assembly portions of the digital transparent armor system.
Figure 7:
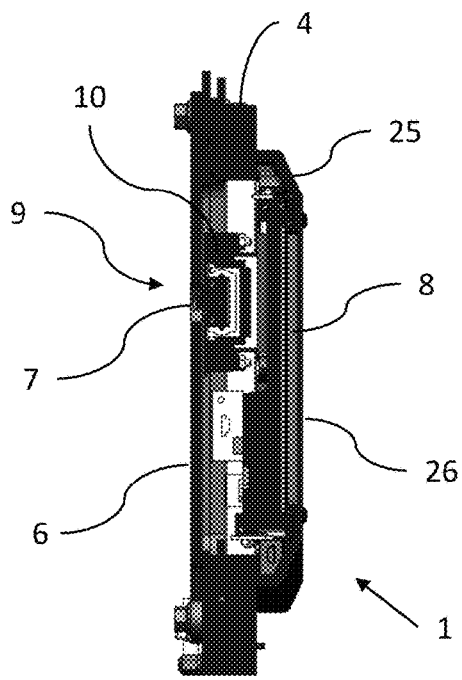
FIG. 7 is a cross section view of an exemplary vehicle door mounted digital transparent armor system.
Figure 9:
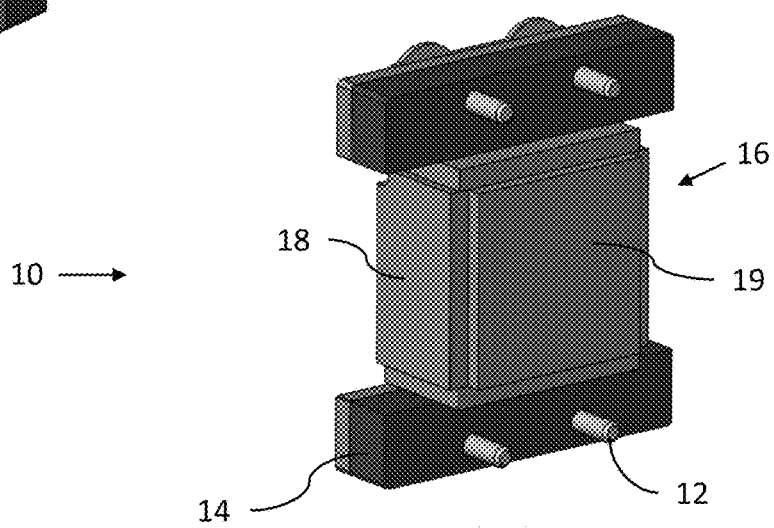
Figure 10:
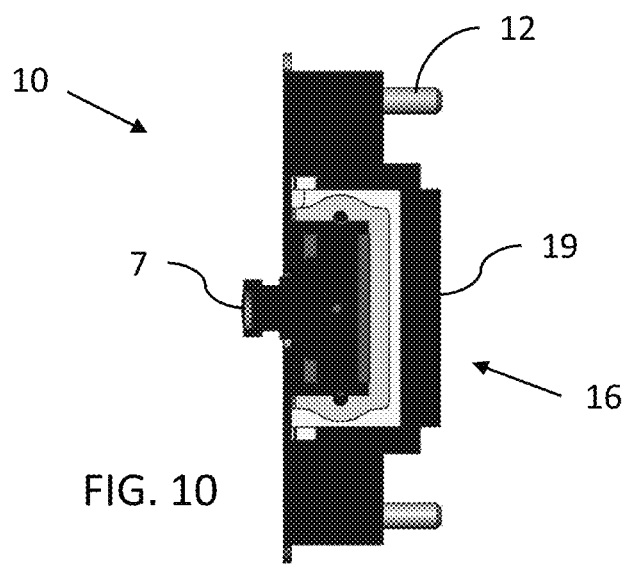
FIGS. 10 and 11 are cross section and front views of the digital video camera and armored camera mounting assembly portions of the digital transparent armor system.
Figure 11:
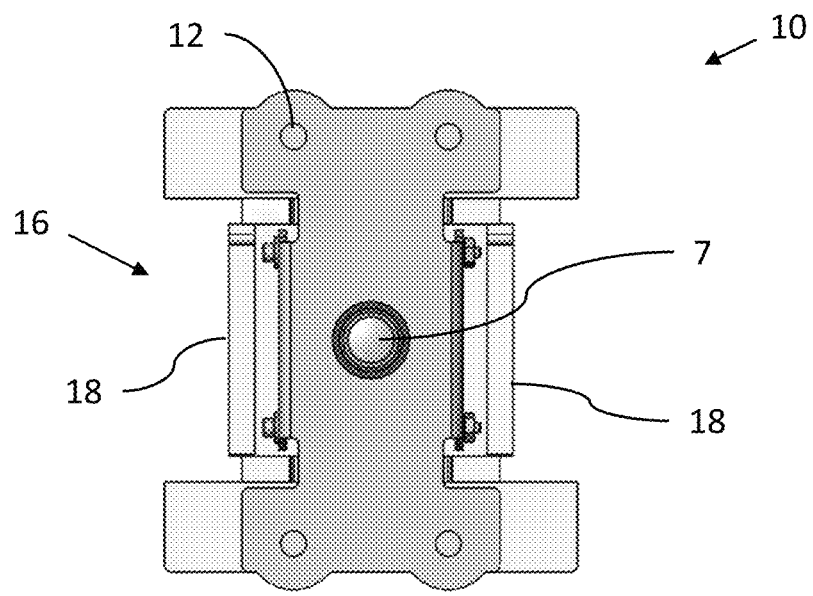

Referring now also to FIGS. 5 through 7, the digital transparent armor system comprises generally an exterior facing armor panel 6, one or more video cameras 7, and an interior facing digital video display or monitor 8, all mounted in an opening 2 in door 4. In operation a live video stream is shown on the display, giving vehicle occupants a view outside as shown in FIG. 4 that mimics the view through a conventional window.

The video cameras 7 are positioned to look outward through apertures 9 in armor panel 6 and are connected through a suitable wiring harness and circuitry to display 8. The apertures 9 are in a portion of the armor panel 6 adjacent the opening 2. The armor panel 6 may have a larger surface area than the display, overlapping the door around a perimeter of opening, and except for the apertures completely cover the digital display as viewed from outside the vehicle. In one embodiment the armor panel is configured such that any projectile fired toward the vehicle must pass through either the armor panel 6 or surrounding vehicle armor, or both, to reach the digital display 8 or otherwise penetrate the vehicle. The armor panel may be made of ballistic grade steel, or any other suitable ballistic resistant material, including composites that incorporate ballistic grade ceramics and/or high strength polymer fibers.

Referring now also to FIGS. 8 through 11 and FIG. 13, the video cameras 7 may be connected to a frame 5 using a camera mounting assembly 10 that may include mounting bolts 12 for attaching the assembly to frame 5, and a shock absorbing layer 14. The shock absorbing layer 14 may comprise any material or construction with the ability to absorb or attenuate a shock impulse produced by a projectile impact on the system, and in particular a projectile impact on camera 7 or mounting assembly 10. In one embodiment shock absorbing layer 14 is made of a visco-elastic material such as Sorbothane sold by Sorbothane Incorporated of Kent Ohio.

In the depicted embodiment the mounting assembly 10 further includes an armor box 16 with sides 18 and a back plate 19 that surrounds the camera, creating an armored barrier between the camera and the display 8. The armor box 16 acts to prevent any projectile passing through the aperture from reaching the display 8 or penetrating the vehicle. The sides and back plate, or strike plate of the armor box may also be a stacked construction (not shown) of multiple steel layers with shaped grooves in all but the back most layer providing for wiring. The box 16 may be made of ballistic grade steel, or any other suitable ballistic resistant material, including composites that incorporate ballistic grade ceramics and/or high strength polymer fibers. The assembly mounting may be configured such that the camera lenses project partially or fully into the apertures 9 in armor panel 6.

Figure 16:
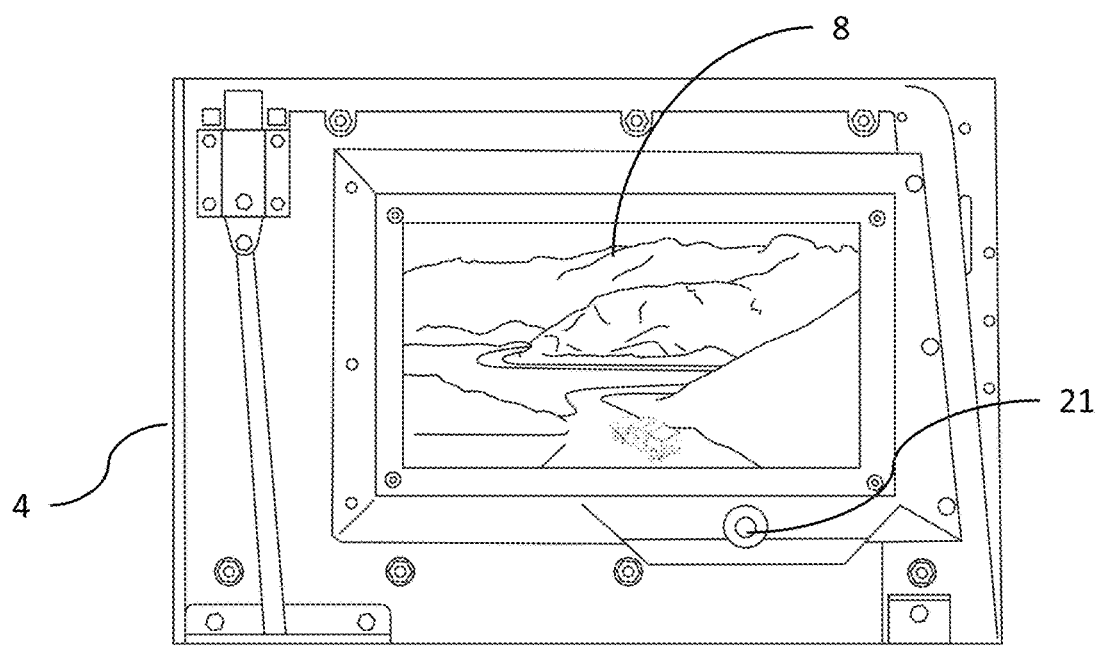
FIG. 16 is an interior view of the digital transparent armor system of FIG. 15 indicating the toggle to switch between active cameras.

In one embodiment the system is configured to have only one video camera active at any one time. The system may include an interior located switch 21 (see FIG. 16) for toggling between active cameras if an active camera becomes disabled through a projectile strike or otherwise. Although the drawings depict two apertures 9 and video cameras 7, the system is not limited to two and may include any number of operable cameras and apertures with the controls to select any one of them as active.

Figure 15:
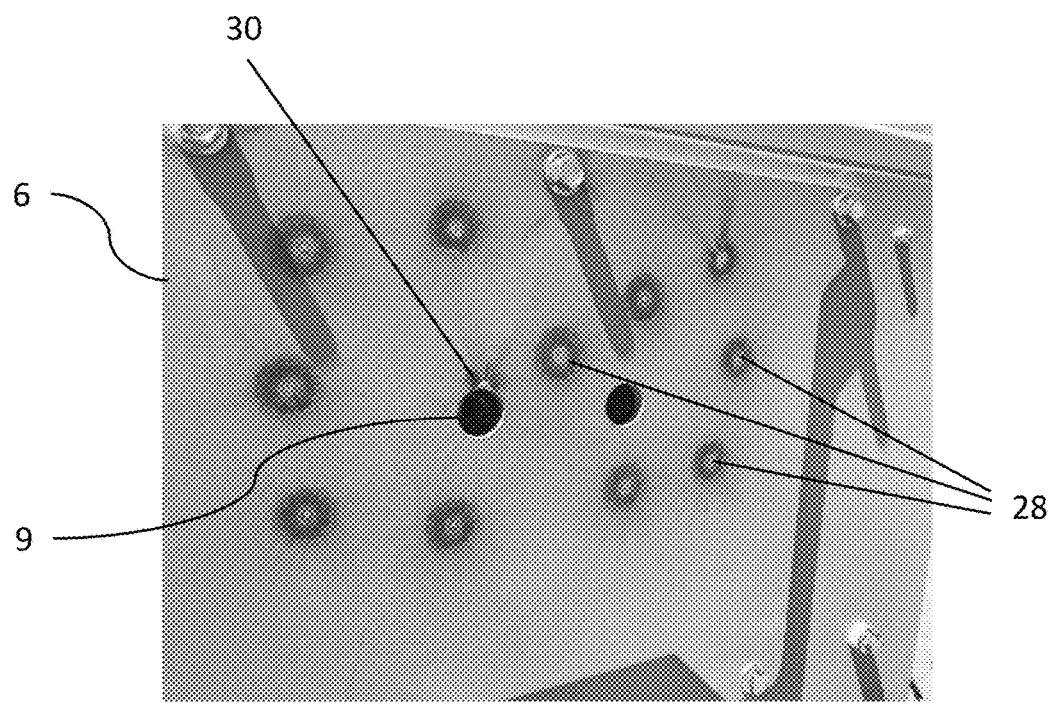
FIG. 15 is an exterior perspective view of the exterior armor panel illustrating an appearance after live fire testing with marks left by multiple projectile impacts.

FIG. 15 is a depiction of armor panel 6 after live fire testing with multiple projectile impact points 28 shown as visible marks on the panel. The depiction includes one particular impact point, indicated at reference numeral 30, coinciding with the left most of the two apertures 9, and intended to illustrate a scenario where the active camera is rendered inoperative by the projectile strike. In such a case, a video image being transmitted from the camera to the display may be interrupted. The system may include an audible sound or warning to alert vehicle occupants that the active camera of that display has been disabled. The occupant may resume the video display by toggling switch 21 to switch over to an undamaged, operable camera.

The cameras 7 may have multiple imaging capability, including optical, infra-red, and thermal imaging. The cameras may be potted in a durable material to enhance shock resistance. In one exemplary embodiment the video cameras 7 are a model VCL-4C2DM HD-SDI 2.2 Megapixel Mini Bullet Camera, sold by Visionite. The system 1 may further include a video converter to convert SDI data from the cameras to HDMI for the display.

Figure 12:
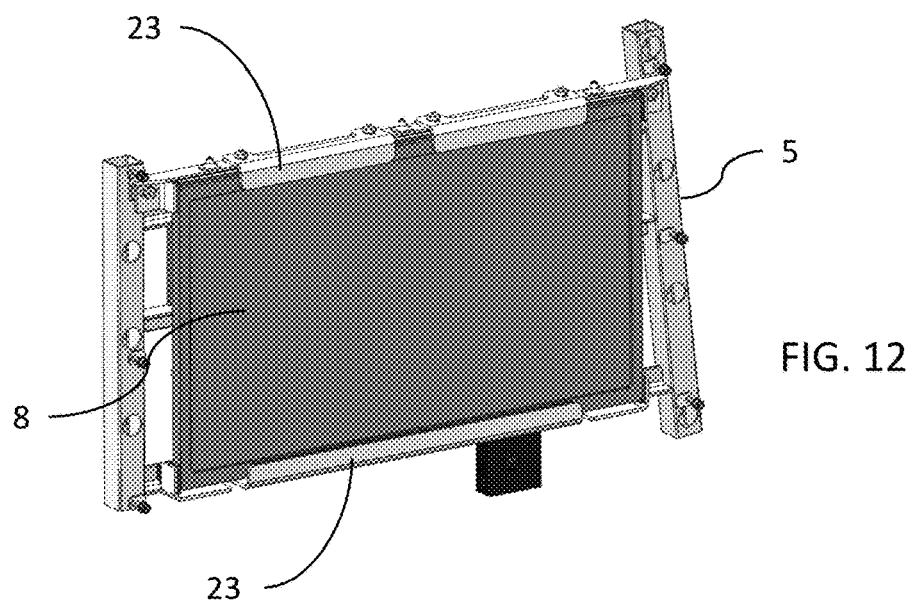
FIGS. 12 and 13 are inside and outside perspective views of the video display and video camera assemblies mounted in a frame portion of the system.
Figure 13:
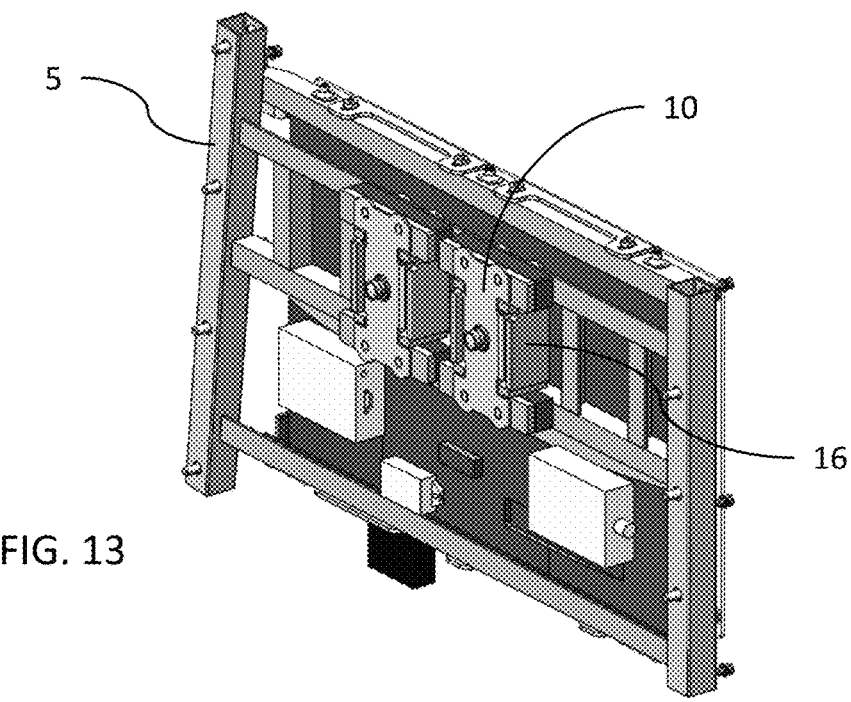

The digital display or monitor 8 is mounted to be viewable from inside the vehicle, and may have a similar or nearly identical appearance to a conventional window or windshield being replaced. In the depicted embodiments the display 8 is mounted to the frame 5 which is mounted to an interior side of the vehicle door. The display may be mounted to frame 5 using various brackets or clamps 23 (see for example FIG. 12) that may be hidden with a trim plate 25. The trim plate may also secure a protective transparent cover 26 that overlays the display 8. The protective cover 26 may be made of a tough, scratch resistant material such as glass or clear polycarbonate.

The digital display may be a touchscreen configured to display among other things, various operational controls. Touchscreen operational controls may include for example camera tilt and pan functions, field of view (FOV) angular range definition, and imaging selection to display optical, thermal, or infra-red imaging. In one exemplary embodiment the digital display is a CPX2-173 rack mount 6U TFT wide screen LCD display with 1920×1080 resolution sold by CP Technologies of San Diego, California.

Figure 14:
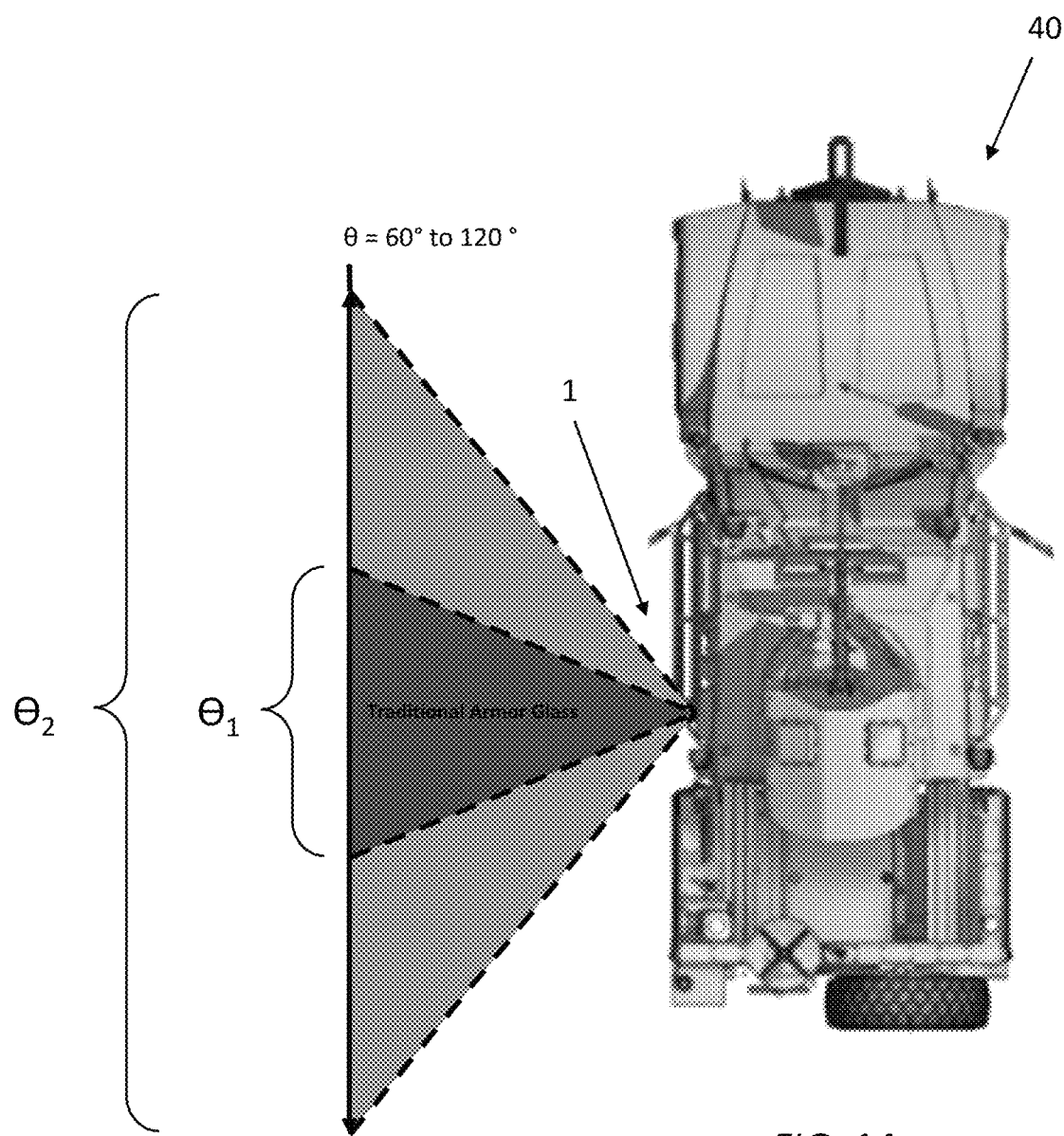
FIG. 14 is a graphic representation of an expanded field of view of the digital transparent armor system with respect to conventional transparent armor.

Referring now to FIG. 14, the system may provide a field of view of the surroundings captured in a video image that is expanded compared to the available field of view with conventional transparent armor. In the depicted embodiment the digital transparent armor system 1 is mounted in a side door of a tactical style vehicle 40. The field of view of a traditional armor glass window is indicated as angle $\theta_1$, and the expanded field of view of the digital transparent armor system 1 is indicated at angle $\theta_2$. In one embodiment $\theta_2$ is at least twice $\theta_1$, and in another embodiment $\theta_2$ is at least 120 degrees. The system may comprise cameras 7 with variable field of view capability, and display controls for selecting between multiple field of view options in the video image over a range of about 30 to 140 degrees.

The system may be powered by an electrical power source such as a vehicle battery and operable over a range of source voltages. In one particular embodiment the system is configured to operate with a DC source voltage in the range of about 8 to 40 volts. The system may include input voltage detection and a voltage correction circuit configured to step up or down the input voltage as needed to deliver an appropriate voltage to the system.

The system may further include an integrated backup power supply comprising batteries capable of powering the system, for example in the event of a loss of vehicle power, or when the vehicle is not running. The system may be configured to detect a loss of power, and then automatically and seamlessly transition to battery backup. The backup power supply may also include a charging circuit configured to automatically maintain the batteries in a fully charged condition.

The armor system may include a power on switch, such as switch 21 on display 8 configured with a power on LED light to indicate system power status. The switch may be configured to illuminate the LED when system power is available. The system may also include a backup battery meter configured to indicate a health condition of the battery backup system. In one embodiment the backup battery meter is an LED indicator with a series of bars to indicate the system charge level.

The digital transparent armor system may include a thermal management system 32 (see FIG. 5) for maintaining the system temperature within a certain range. In one embodiment the thermal management system is autonomous and operates automatically to heat or cool the system. The thermal system may comprise a built in thermal heating blanket and a thermal controller which detects a low set threshold temperature and automatically turns off when a pre-set desired operating temperature is met. The thermal management system may also incorporate static or dynamic cooling features in case of relatively high temperature operating environment. Such cooling features may include conductive heat sinks and cooling fans of the types typically utilized in laptop or desktop computers.

The system may include a data link enabling the reception and display of data from other vehicles or digital transparent armor system installations. The additional data may comprise for example a video feed from another vehicle of a tactical vehicle group. The system may be configured to select and display the received data on display 8 in real-time, for example to provide improved situational awareness in a battlefield environment. In addition, the system may include accessible memory for storing received data and then retrieving it later for display or analysis. The system may further include continuous recording to record all displayed data whether internal or external to memory in the manner of a black box, with multiple days storage capability at any given time.

The digital transparent armor system may further comprise a method for providing a live view to the outside of a vehicle without utilizing conventional transparent armor. In one embodiment the method comprises a first step 101 of providing an opening in an armored surface of a vehicle. The armored surface of the vehicle may be a door, and the opening may be an existing opening in the door for a conventional transparent armor window.

The method may include a second step 201 of securing an armor panel made of ballistic grade steel or ballistic composite materials to the outside of the vehicle armored surface, wherein the armor panel completely covers the opening.

The method may include a third step 301 of providing a first aperture through the armor panel in a portion of the panel within the opening. In one embodiment the first aperture is a cylindrical hole that is molded or drilled.

The method may include a fourth step 401 of disposing a first video camera in the aperture aimed outward to capture video of the vehicle surroundings.

The method may include a fifth step 501 of mounting a video display to the vehicle armored surface on the inside of the opening. A viewable portion of the video display may be substantially equivalent in size to the opening or much larger.

The method may include a sixth step 601 of transmitting a video signal from the first video camera to the video display.

The method may include a seventh step 701 of providing an armor plate made of ballistic grade steel or ballistic composite materials between the first video camera and the video display.

The method may further include an optional eighth step 801 of providing a second aperture through the armor panel in a portion of the panel within the opening, and a second video camera disposed in the aperture aimed outward to capture video of the vehicle surroundings.

The method may further include an optional ninth step 901 of operating a switch to selectively connect an active video signal from one of the first and second video cameras to the video display.

The method may further include an optional tenth step 1001 of operating a control on the display to vary a video parameter. The video parameter may be a field of view angle of a selected one of the first and second video cameras.

The method may further include an optional eleventh step 1101 of detecting a temperature condition of the system, and heating or cooling the system as needed in response to the temperature condition.

The method may further include an optional twelfth step 1201 of selecting between optical, thermal or infra-red video image to be shown on the video display.

The method may further include an optional thirteenth step 1301 of receiving and displaying an external video signal from another vehicle equipped with a digital transparent armor system.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under § 112, 6th paragraph is not intended. Additionally, it is not intended that the scope of patent protection afforded the present invention be defined by reading into any claim a limitation found herein that does not explicitly appear in the claim itself.

What is claimed:

1. A video enabled armored system adapted for incorporating in an armored surface, comprising:
    an exterior facing ballistic resistant armor panel mounted over an opening in the armored surface, the armor panel overlaying the armored surface around a perimeter of the opening;
    a first aperture through the armor panel in a portion of the panel adjacent the opening;
    a first video camera disposed in the first aperture and aimed outward through the first aperture; and
    a video display operatively connected to the first video camera and mounted over the opening on an interior side of the armored surface; and
    a ballistic containment structure disposed between the first video camera and the display, substantially covering the first camera and first aperture from an interior side, wherein the first camera is mounted to the armored surface and isolated with a layer of a shock attenuating material.

2. The video enabled armor system of claim 1, wherein the ballistic resistant armor panel comprises ballistic grade steel, or any other ballistic resistant material including composites that incorporate ballistic grade ceramics or high strength polymer fibers.

3. The video enabled armor system of claim 1, wherein the first camera and the ballistic containment structure are part of a camera mounting assembly that is mounted to the armored surface and isolated by the shock attenuating material.

4. The video enabled armor system of claim 3, wherein the camera mounting assembly is mounted to a frame that is secured to an interior side of the door.

5. The video enabled armor system of claim 1, wherein the armored surface is a door, and the opening is an opening in the door configured for a conventional transparent armor window.

6. A video enabled armored system adapted for incorporating in an armored surface, comprising:
   an exterior facing ballistic resistant armor panel mounted over an opening in the armored surface, the armor panel overlaying the armored surface around a perimeter of the opening;
   a first aperture through the armor panel in a portion of the panel adjacent the opening;
   a first video camera disposed in the first aperture and aimed outward through the first aperture; and
   a video display operatively connected to the first video camera and mounted over the opening on an interior side of the armored surface; and
   a ballistic containment structure disposed between the first video camera and the display, substantially covering the first camera and first aperture from an interior side, wherein the ballistic containment structure comprises a steel box with four sides and a back that fully covers the first camera and first aperture.

7. The video enabled armor system of claim 6, further comprising an integrated backup battery system capable of powering the armor system in the event of a loss of power.

8. The video enabled armor system of claim 7, wherein the backup battery system includes a detection circuit configured to detect a loss of power and automatically transition to battery backup.

9. A method for providing a live video view of environmental surroundings, comprising the steps of:
   providing an opening in an armored surface;
   securing an armor panel made of ballistic grade steel or ballistic composite materials to the outside of the armored surface, wherein the armor panel completely covers the opening;
   providing a first aperture through the armor panel in a portion of the panel within the opening;
   disposing a first video camera in the aperture aimed outward to capture video of the surroundings;
   mounting a video display to the armored surface on the inside of the opening;
   transmitting a video signal from the first video camera to the video display; and
   providing a ballistic containment structure between the first video camera and the video display; and
   providing a second aperture through the armor panel in a portion of the panel within the opening, and a second video camera disposed in the second aperture and aimed outward to capture video of the surroundings.

10. The method of claim 9, further comprising the step of operating a switch to selectively connect an active video signal from one of the first and second video cameras to the video display.

11. The method of claim 9, further comprising the step of operating a video control on the display to select video parameters comprising camera pan and tilt or image field of view angular range.

12. The method of claim 9, further comprising detecting a temperature condition of the system, and heating or cooling the system as needed in response to the temperature condition.

* * * * *